(12) United States Patent
Ham

(10) Patent No.: US 10,856,056 B2
(45) Date of Patent: Dec. 1, 2020

(54) SENSOR NETWORK FOR MEASURING SOIL MOISTURE

(71) Applicant: Colorado State University Research Foundation, Fort Collins, CO (US)

(72) Inventor: Jay M. Ham, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/561,857

(22) Filed: Sep. 5, 2019

(65) Prior Publication Data

US 2020/0084520 A1 Mar. 12, 2020

Related U.S. Application Data

(60) Provisional application No. 62/728,369, filed on Sep. 7, 2018.

(51) Int. Cl.
*H04Q 9/00* (2006.01)
*H04L 29/08* (2006.01)
*H04B 17/318* (2015.01)
*H04L 12/66* (2006.01)

(52) U.S. Cl.
CPC ............. *H04Q 9/00* (2013.01); *H04B 17/318* (2015.01); *H04L 67/12* (2013.01); *H04L 12/66* (2013.01); *H04Q 2209/10* (2013.01); *H04Q 2209/40* (2013.01); *H04Q 2209/84* (2013.01)

(58) Field of Classification Search
CPC .. H04Q 9/00; H04Q 2209/00; H04Q 2209/10; H04Q 2209/20; H04Q 2209/25; H04Q 2209/40; H04Q 2209/80; H04Q 2209/84; H04B 17/318; H04L 67/12; H04L 12/66
See application file for complete search history.

(56) References Cited

U.S. PATENT DOCUMENTS

2019/0187086 A1* 6/2019 Burkey ............... H04L 67/2842
2019/0307084 A1* 10/2019 Ersavas ................ G05B 15/02
2020/0107508 A1* 4/2020 Canyon ................ A01G 25/167

FOREIGN PATENT DOCUMENTS

WO WO-2005060653 A2 * 7/2005 ........... G01N 27/221

OTHER PUBLICATIONS

Akyildiz, I. F., Sun, Z. and Vuran, M. C. (2009) 'Signal propagation techniques for wireless underground communication networks', Physical Communication. Elsevier, 2(3), pp. 167-183.
Oates, M. J. et al. (2017) 'Temperature compensation in a low cost frequency domain (capacitance based) soil moisture sensor', Agricultural Water Management. Elsevier, 183, pp. 86-93.

(Continued)

*Primary Examiner* — Franklin D Balseca
(74) *Attorney, Agent, or Firm* — Meunier Carlin & Curfman LLC

(57) ABSTRACT

Described herein are embodiments of a system comprising an underground sensor network that measures soil moisture by quantifying how changes in soil water content affect the attenuation of radio signals between buried sensor nodes. Also disclosed herein are methods of using the described system for measuring soil moisture and using the measurement for various control aspects including for example controlling irrigation in agricultural and urban settings.

27 Claims, 6 Drawing Sheets

(56) References Cited

OTHER PUBLICATIONS

Zaman, I. et al. (2016) 'Demo: Design and Evaluation of MoleNet for Wireless Underground Sensor Networks', in 2016 IEEE 41st Conference on Local Computer Networks Workshops (LCN Workshops).

Miner, G.L, J.M. Ham, and G.J. Kluitenberg. 2017 A heat-pulse method for measuring sap flow in corn and sunflower using 3D-printed sensor bodies and low-cost electronics. Agric. Forest Meteorol. 246:86-97.

* cited by examiner

SENSOR NETWORK FOR MEASURING SOIL MOISTURE

CROSS-REFERENCE TO RELATED APPLICATION

This application claims priority to and benefit of U.S. Provisional Patent Application Ser. No. 62/728,369 filed Sep. 7, 2018, which is fully incorporated by reference and made a part hereof.

BACKGROUND

Soil water content affects almost every ecological, agricultural, and hydrological process at the land-atmosphere interface. Soil moisture, especially near the surface, varies in space and time in response to a long list of biophysical factors making it difficult to measure and model. Water managers and other stakeholders could use real-time soil moisture data if it were readily available. Unfortunately, sensors that provide automated, continuous soil water measurements and connect to the internet (i.e., the Cloud) are expensive and complex. Commercial sensors and dataloggers cannot be economically deployed in large enough numbers to make them useful for applied water management.

Furthermore, efficient irrigation (timing and amount) hinges on knowing the current soil moisture status in the soil. However, running wires and installing multiple radio towers within a field or urban landscape is often impractical.

Recent developments associated with 3D printing, electronics, and Internet-of-things connectivity have "opened the door" for a new generation of real-time soil moisture measurement technology. Underground sensor networks offer the advantage of being essentially "invisible" while providing highly granular soil data. Such a system would be especially useful in the automated management of irrigation systems associated with precision agriculture. The technology could also be a boon for controlling urban irrigation systems (turf and landscape irrigation, golf courses, etc.)

Therefore, what is needed is systems and methods that overcome challenges in the art, some of which are described above.

SUMMARY

Described herein are embodiments of a system comprising an underground sensor network that measures soil moisture by quantifying how changes in soil water content affect the attenuation of radio signals and the quality of the network radio link between buried sensor nodes. Also disclosed herein are methods of using the described system for measuring soil moisture and using the measurement for various control aspects including for example controlling irrigation in agricultural and urban settings.

A network comprised of a plurality of underground sensor nodes gather and provide data to an aboveground node (or gateway). Generally, data transmission among underground nodes and to the gateway nodes is accomplished wirelessly, though in some instances there may be wires between one or more of the underground sensor nodes and the gateway. As used herein, "wires" includes electrically conductive elements (insulated or non-insulated) as well as fiber optic cables. In some instances, a "master" underground node provides data to the gateway, while in other instances the gateway receives data from each or from several of the underground sensor nodes. Generally, each of the plurality of sensor nodes are transceivers, though in some instances some of the underground sensor nodes are transmitters only and others are receivers only. The data provided to the gateway comprises information about attenuation of signals between the signal nodes and the quality of the wireless network connection among nodes. The quality of the network connection is quantified by sending $100s$ of date packets between nodes and measuring packet reception ratio, link quality indicator, and latency. The attenuation data is correlated with soil moisture content. Network link quality is also affected by soil moisture content, providing additional information on soil moisture status.

Each underground sensor node is small (e.g., domino-sized) and has an onboard power source such as a battery, which can last for up to 10 years. In some instances, the gateway receives data from the underground network of sensor nodes and routes the data to a cloud computing network for analysis. A typical underground sensor node is comprised of a microprocessor, a radio transceiver, an antenna, and a power source (e.g., a battery). On a periodic basis (e.g., every hour, every two hours, every 30 minutes, etc.), the aboveground gateway polls the underground sensor network and obtains measurements related to attenuation of signals between the underground sensor nodes (e.g., relative received signal strength (RSSI) and/or packet reception rate (PRR) between nodes). The signal attenuation information (e.g., RSSI and/or PRR information) between nodes is used to approximate soil moisture along the path between nodes (i.e., how water in the soil attenuates radio signal strength). In some instances, one or more of the plurality of underground sensor nodes may further comprise a temperature sensor and/or a soil moisture sensor, and the polled data may include one or more of a battery status of each underground sensor node and measurements of soil moisture and temperature having the on-board sensors. Data from the soil moisture sensors is used for data quality assurance (i.e., backup data) and system calibration as soil moisture is generally determined by the attenuation of signals along vertical or horizontal radio signal propagation paths below the surface.

The gateway and/or the cloud computing network receives data from the underground sensor nodes and determines signal attenuation between the sensor nodes. An algorithm executing on a processor on the gateway and/or in the cloud computing network correlates the signal attenuation with soil moisture content. The determined soil moisture content can then be used to control other systems. For example, an irrigation system may be turned on or off or water flow adjusted based on the determined soil moisture content. Artificial intelligence (AI) or machine learning algorithms can be used in the control of these other systems.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
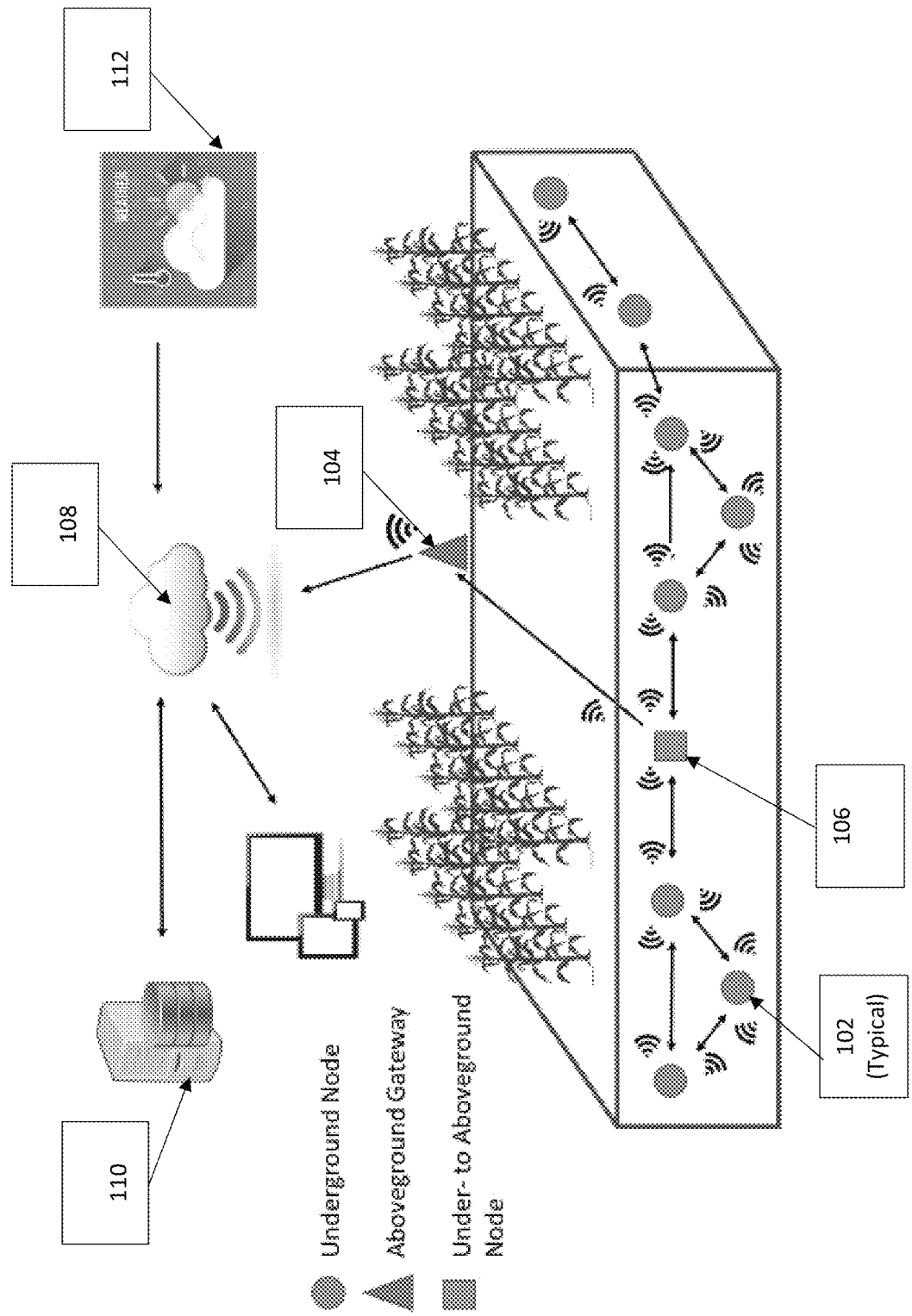
FIG. 1A is an exemplary overview illustration of a system for determining soil moisture content.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented and wireless networking computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1A is an exemplary overview illustration of a system for determining soil moisture content. As shown in FIG. 1A, a plurality of underground sensor nodes 102 form a network. The underground sensor nodes 102 are typically buried from 10 to 100 cm, depending upon the application. For example, on a golf course the sensor nodes 102 may be buried only a few centimeters in depth—deep enough to avoid aeration spikes, while in a farm field the sensor nodes 102 may be buried a depth of 20 cm or more so that they are not dug up when the field is plowed. Sensor nodes 102 are typically spaced apart by one to two meters, though in some instances the plurality of sensor nodes can be spaced up to 25 meters from one another. In some instances, one or more sensor nodes 102 may be located on top or above the ground level so that attenuation between an underground sensor and a sensor node at or above ground level can be measured. Generally, each underground sensor node 102 comprises a transceiver—it both transmits and receives signals. A non-limiting example of a transceiver that may be used is RFM69HCW or RFM96LoRa by HopeRF Electronic (Shenzhen, China). In some instances, though, some of the underground sensor nodes 102 may only be transmitters, while others are only receivers. Each sensor node 102 has an onboard power source, typically a battery. A non-limiting example of a battery that can be used is a 600 mAH, 3.7V, Lithium ion polymer battery. Generally, each sensor node is encapsulated to prevent infiltration of water and dirt and the ensuing degradation of the components.

Some or all of the sensor nodes 102 transmit signals while some or all of the sensor nodes 102 receive the signals. Signals typically have a frequency from 200 MHz to 1000 MHz. For example, in some applications the signals are 433 MHz. In some other applications the signals may be 915 MHz. Each sensor node 102 that is transmitting a signal transmits it at a defined power level. For example, a typical power level may be 20 dB, though other power levels can be used. Sensor nodes 102 that receive a transmitted signal record the power level of the received signal. This information (the power level of the transmitted signal and the power level of the received signal) is used to determine attenuation of the signal. Attenuation is typically greater in soil with a higher moisture content and lesser in soil that is drier.

Figures 1B, 1C:
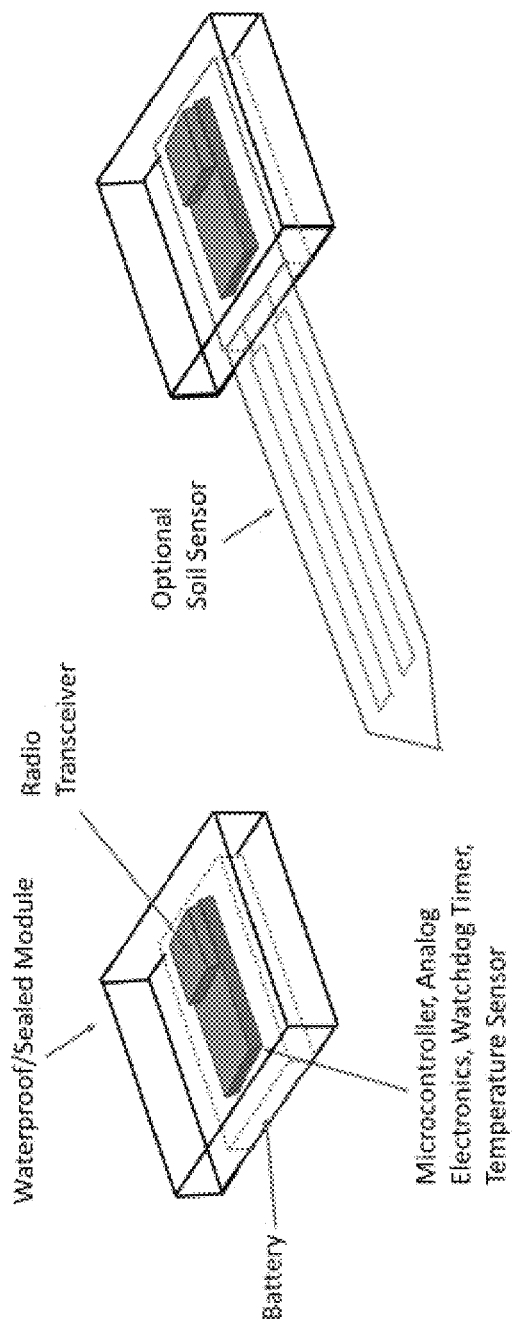
FIG. 1B is an illustration of an embodiment of an exemplary sensor node.
FIG. 1C is an illustration of an embodiment of an exemplary sensor node that incorporates an optional soil sensor.

Data from the sensor nodes 102 is transmitted to an aboveground gateway 104. (which can then be accessed by remote computers via any wired or wireless networks, including the Internet, cellular, or satellite). In some instances, the data is transmitted wirelessly from all or some of the sensor nodes 102 to the gateway 104, in other instances there is a wire between the gateway 104 and all or some of the sensor nodes 102 (see FIG. 1B), while in other instances there may be a combination of wired and wireless connections between the sensor nodes 102 and the gateway 104. Generally, each sensor node 102 spends most of the time in sleep mode to conserve power, then wakes at a pre-programmed interval as controlled by an on-board hardware watchdog timer. A unique method keeps all the underground nodes synchronized (i.e., waking and sleeping on the same schedule) without using real time clocks. This is accomplished by interrupting power to the onboard watchdog timer chip using a MOSFET when the gateway node 104 seeds a command to sleep. The gateway node 104, spends most of its time in listening mode. However, once the gateway 104 detects that the underground nodes are awake, it initiates a unique polling routine that collects data from all the sensor nodes 102 via the master sensor nodes 106. Once data are collected, the gateway 104 instructs all the underground nodes (sensor nodes 102 and master sensor nodes 106) to enter sleep mode. The period between polls may be any time period, for example one hour, two hours, two and one-half hours, four hours, 10 hours, etc. As stated previously, the sensor node 102 is in sleep mode between polls in order to extend battery life. The sensor node 102 is programmed to "wake" itself on a periodic basis, where it is recognized by the gateway 104. The gateway 104 then initiates a measurement and data transfer protocol between all 102 and 106 nodes. In some instances, a sensor node 102 buffers the sensor data from adjacent nodes to local memory or flash memory until it is transmitted to the gateway 104 and/or a "master" sensor node 106.

In some instances, the sensor nodes 102 transmit their data to a "master" sensor node 106, and the master sensor node 106 transmits the data to the gateway 104, while in other instances each sensor node 102 may transmit its data directly to the gateway 104. In some instances, the "master" sensor node 106 may be connected to the gateway 104 by a wire. In other instances, the "master" sensor node 106 transmits data wirelessly to the gateway 104. Sensor nodes 102 may be configured to dynamically self-organize and form an adaptive mesh network (where one or more sensor nodes may act as "master" sensor nodes 106) that allows them to communicate with each other and relay data to the gateway 104. All sensor nodes 102 and "master" sensor nodes 106 are powered using, for example, batteries or other self-contained energy sources. Sensor nodes 102 can be programmed to perform a wide range of tasks including sampling, storage, processing, and communication of sensor data. Generally, a sensor node 102 transmits data to the "master" sensor node 106 and/or the gateway 104 using the same transmitter (and frequency) that it transmits signals to other sensor nodes 102.

Figure 2:
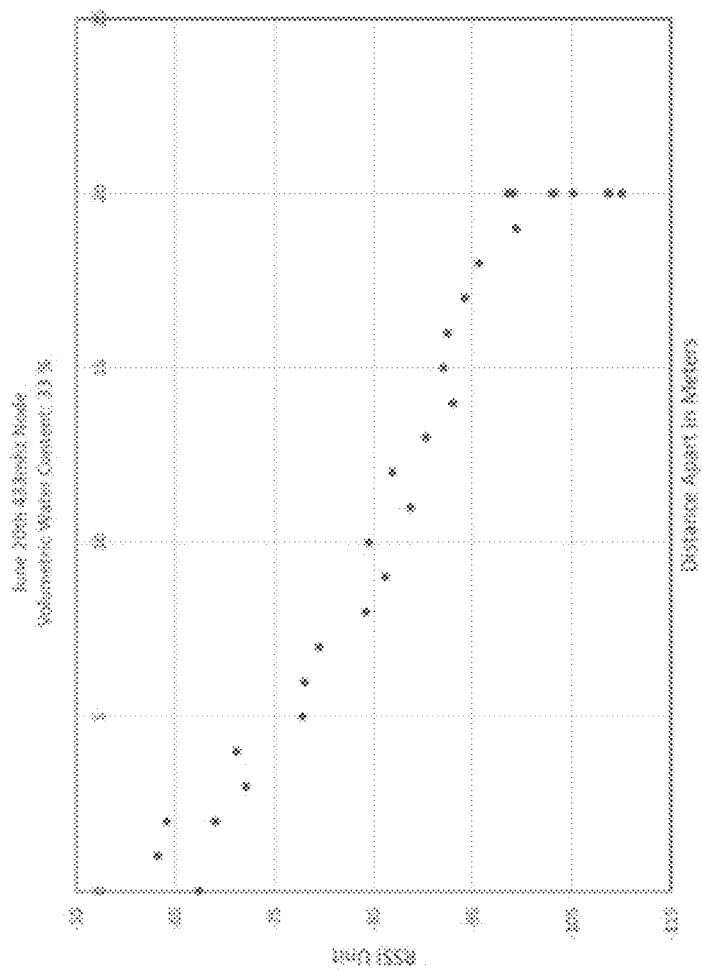
FIG. 2 illustrates relative signal strength (RSSI) of a 433 MHz signal as affected by distance between a 25-cm-deep buried sensor node and an aboveground gateway.

Data is transferred from the gateway 104 to a computing network. Typically, the computing network comprises a cloud computing network 108. Generally, the gateway 104 will have a receiver and/or transceiver for receiving data from the plurality of sensor nodes 102, and a wireless radio for transmitting the data from the gateway 104 to the cloud computing network 108. The radio may comprise, for example, a WiFi (IEEE 802.11n), Bluetooth, cellular, or satellite transmitter. The gateway 104 typically has its own power source, which may be batteries and/or solar panels. In some instances, the solar panels can be used to recharge the batteries of the gateway 104. In some instances, the gateway 104 can be, for example, a microcomputer used for both control and monitoring of the sensor array as well as for data storage and analysis. The gateway 104 can be positioned so that it does not interfere with above-ground operations such as those of a golf course, farm, or other application. For example, the gateway 104 may be located up to 60 meters from the plurality of sensor nodes. FIG. 2 illustrates relative signal strength (RSSI) of a 433 MHz signal as affected by distance between a 25-cm-deep buried sensor node 102 and an aboveground gateway 104.

Returning to FIG. 1B, an illustration of an embodiment of a sensor node 102 is shown. A typical underground sensor node 102 is comprised of a microprocessor, a radio transmitter and/or a radio receiver, or a transceiver, an antenna, and a power source (e.g., a battery). On a periodic basis (e.g., every hour, every two hours, every 30 minutes, etc.), the aboveground gateway polls the underground sensor network and obtains measurements related to attenuation of signals between the underground sensor nodes (e.g., RSSI and/or PRR between nodes). The signal attenuation information (e.g., RSSI and/or PRR information) between nodes is used to approximate soil moisture along the path between nodes (i.e., how water in the soil attenuates radio signal strength). In some instances, one or more of the plurality of underground sensor nodes may further comprise a temperature sensor and/or a soil moisture sensor, and the data may include one or more of a battery status of each underground sensor node and measurements of soil moisture and temperature having the on-board sensors. In some embodiments, the soil moisture sensor comprises a capacitive sensor. Data from the soil moisture sensor is used for data quality assurance (i.e., backup data), as soil moisture is generally determined by the attenuation of signals along vertical or horizontal radio signal propagation paths below the surface. Generally, the soil moisture sensor provides small scale measurements close to the sensor while radio attenuation determines soil moisture content at larger scales governed by the installation depth and the horizontal distance among sensor nodes 102. A soil temperature sensor provides useful additional information to a user of the network. For example, soil temperature can be used to optimize the date of planting or predict the emergence of pests and pathogens.

Figure 3:
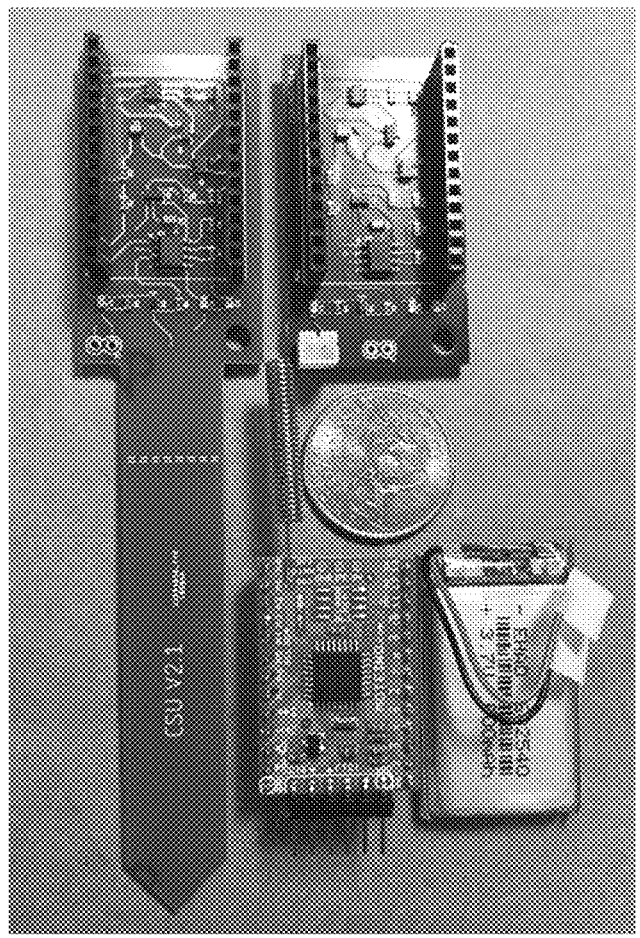
FIG. 3 is an image of a typical sensor node.

As noted above, the data transmitted from the underground sensor node 102 to the gateway 104 includes at least information about the received signal strength (assuming that all sensor nodes transmit power at the same power level). For example, the data may include RSSI information or PRR information, or RSSI and PRR information. Optionally, the data may include additional information such as information about the temperature of the soil and/or the measured moisture content of the soil at the sensor location. In some instances, the data may include an indication of the battery life of the sensor node 102 (i.e., a battery status). The sensor nodes 102 send packets of information to master sensor nodes 106 and/or gateway 104. Each packet may contain multiple variables, (node identifier, RSSI, PRR, battery status, temperature, etc.). If the node contains the optional soil moisture sensor (see FIG. 1C), a local measurement of soil moisture is also sent in the data packet. FIG. 3 is an image of a typical sensor node 102.

Figure 4:
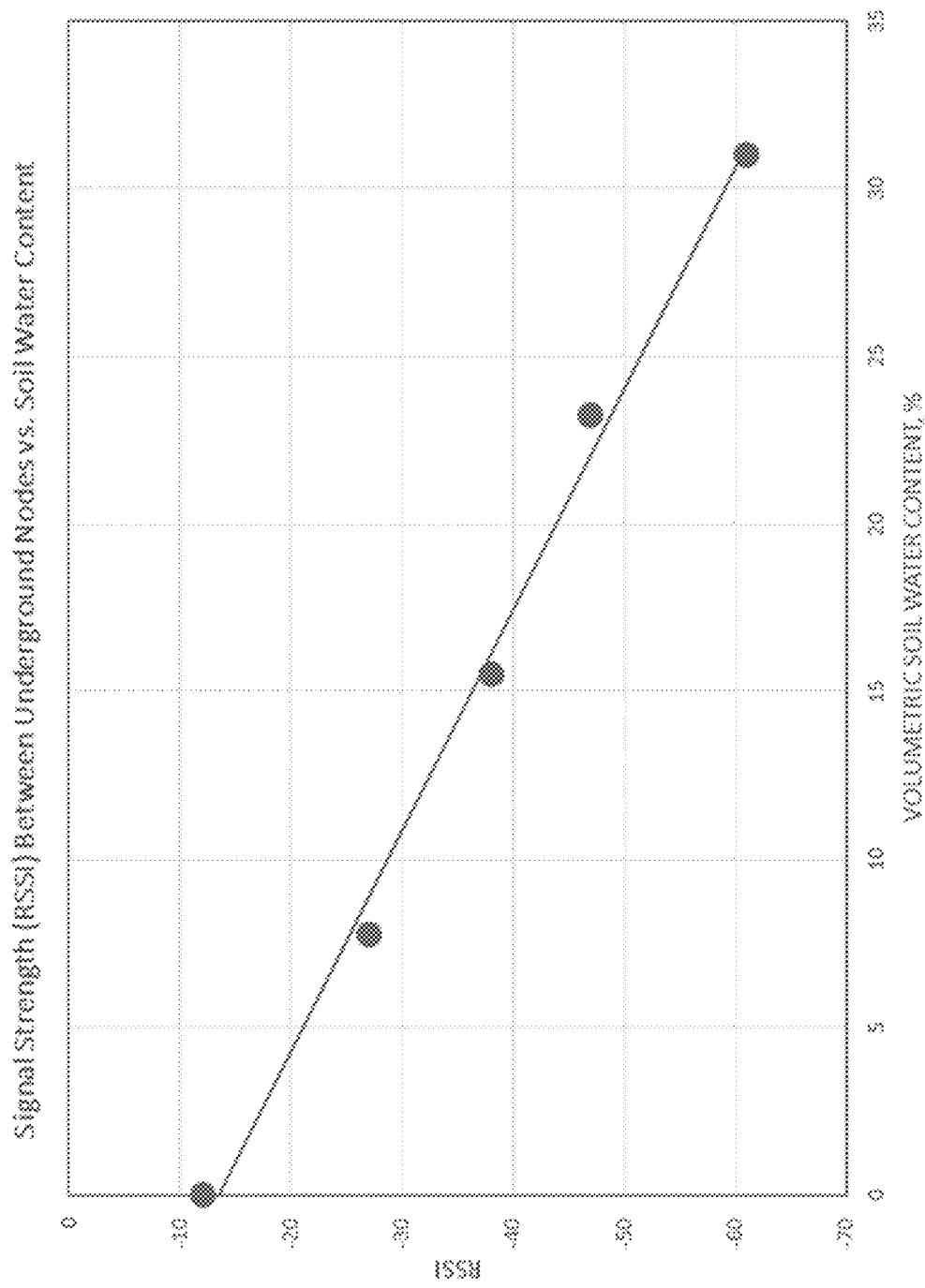
FIG. 4 is a graph that represents an example of the correlation between RSSI and volumetric soil water content as measured between two underground sensor nodes buried 10 cm deep, spaced 40 cm apart.

Some or all of the data received by the gateway 104 from the plurality of underground sensor nodes 102 is transmitted to a computing network. Generally, this will be a cloud computing network 108. The cloud computing network 108 analyzes the data and makes determinations about the moisture content of the soil in the area where the plurality of sensor nodes 102 are located. For example, the cloud computing network 108 executes algorithms that correlates the attenuation information with soil moisture content. A non-limiting example of such correlation is shown in FIG. 4, which illustrates RSSI graphed against volumetric soil water content. In some instances, the cloud computing network 108 may employ AI and adaptive learning to provide an input to a control system 110. For a non-limiting example, an embodiment of the disclosed soil moisture content system may be used to control an irrigation system. Though the measured moisture content may be low, the cloud computing network 108 may receive an input from a weather monitoring station 112, so the cloud computing network 108 may train its AI such that the irrigation system is not employed when the weather indicates rain, or it may reduce the amount of water used during irrigation to accommodate the expected rainfall. Other non-limiting examples of the application of AI include using weather forecast information to estimate expected water use (i.e., evapotranspiration) using well established formula (e.g., American Society of Civil Engineers Standardized Reference Evapotranspiration Equation). Thus, forecasts of precipitation and expected consumptive use can be combined with the soil moisture information to improve the timing and amount of irrigation. As the system operates over time, machine learning algorithms obtain feedback from the soil moisture network and become better at scheduling irrigations on a site-specific basis.

Figure 5:
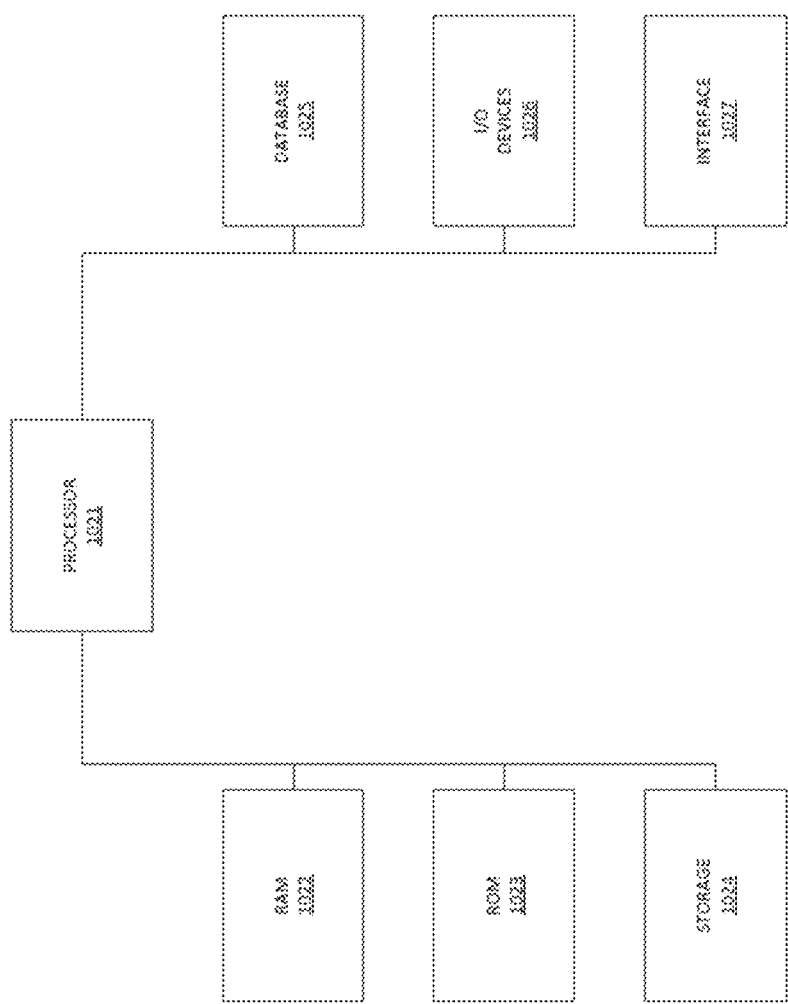
FIG. 5 illustrates an exemplary computer that may comprise all or a portion of a sensor node, a gateway, a "master" sensor node, a cloud computing network, and/or a separate control system; conversely, any portion or portions of the computer illustrated in FIG. 5 may comprise all or a portion of a sensor node, a gateway, a "master" sensor node a cloud computing network, and/or a separate control system.

FIG. 5 illustrates an exemplary computer that may comprise all or a portion of a sensor node 102, a gateway 104, a "master" sensor node 106, a cloud computing network 108, and/or a control system 110. Conversely, any portion or portions of the computer illustrated in FIG. 5 may comprise all or a portion of a sensor node 102, a gateway 104, a "master" sensor node 106, a cloud computing network 108, and/or a control system 110. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments such as, for example, an algorithm for determining signal attenuation and correlating the signal attenuation with soil moisture content. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a system (e.g., an irrigation system) and/or receiving and/or processing and/or transmitting data associated with a network of sensor nodes used to measure soil moisture content. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the soil moisture content correlated with signal attenuation. The database may also contain data and instructions associated with computer-executable instructions for controlling a system (e.g., an irrigation system) and/or receiving and/or processing and/or transmitting data associated with a network of sensor nodes used to measure soil moisture content. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for determining soil moisture content comprised of:
 a plurality of sensor nodes, wherein each sensor node comprises:
  a processor in communication with a memory;
  a communication module;
  an antenna; and a power source; and
 a gateway; and
 a computing network,
 wherein each of the plurality of sensor nodes transmit and/or receive radio frequency (RF) signals and each of the plurality of sensor nodes transmit data related to the transmitted and/or received RF signals to the gateway, and the gateway transmits the data related to the transmitted and/or received RF signals to the computing network,
 wherein the computing network determines, from the data related to the transmitted and/or received RF signals, attenuation of RF signals transmitted between each of the plurality of sensor nodes and correlates the attenuation of the RF signals transmitted between each of the plurality of sensor nodes with the soil moisture content to determine average soil moisture content in soil between the plurality of sensor nodes.

2. The system of claim 1, wherein the communication module of each of the plurality of sensor nodes comprises a transceiver and the transceiver of each sensor node of the plurality of sensor nodes transmits and/or receives the RF signals and transmits the data related to the transmitted and/or received RF signals to the gateway.

3. The system of claim 1, wherein the transmitted and/or received RF signals have a frequency range between 200 MHz and 1000 MHz.

4. The system of claim 1, further comprising a master sensor node, wherein each of the plurality of sensor nodes transmit the data related to the transmitted and/or received RF signals to the master sensor node and the master sensor node transmits the data related to the transmitted and/or received RF signals to the gateway.

5. The system of claim 1, wherein one or more of the plurality of sensor nodes are buried at a depth that ranges between 0 and 100 cm, wherein a distance between any of the plurality of sensor nodes is up to 25 meters, and wherein a distance between any of the plurality of sensor nodes and the gateway is up to 60 meters.

6. The system of claim 1, wherein at least one of the plurality of sensor nodes further comprises a moisture sensor and a temperature sensor.

7. The system of claim 6, wherein the data related to the transmitted and/or received RF signals further comprises data from the moisture sensor and/or data from the temperature sensor and/or an identifier that identifies each of the plurality of sensor nodes individually.

8. The system of claim 7, wherein the data from the moisture sensor is used by the computing network to verify the determined average soil moisture content in the soil between the plurality of sensor nodes.

9. The system of claim 1, wherein the computing network uses the determined average soil moisture content in the soil between the plurality of sensor nodes to provide an input control signal to a separate system.

10. The system of claim 9, wherein the separate system is an irrigation system, and the input control signal causes the irrigation system to turn off, turn on, or to regulate a flow of water.

11. The system of claim 9, wherein the computing network uses AI and/or adaptive learning to generate the input control signal.

12. The system of claim 1, wherein the computing network used uses AI and/or adaptive learning to determine the average soil moisture content in the soil between the plurality of sensor nodes.

13. The system of claim 1, wherein the computing network, determining from the data related to the transmitted and/or received RF signals the attenuation of the RF signals transmitted between each of the plurality of sensor nodes, further determines relative received signal strength (RSSI) and/or packet reception rate (PRR) of the RF signals transmitted between each of the plurality of sensor nodes.

14. A method for determining soil moisture content comprised of:
 transmitting and/or receiving radio frequency (RF) signals between a plurality of sensor nodes;
 transmitting, by each of the plurality of sensor nodes, data related to the transmitted and/or received RF signals to a gateway;
 receiving, by the gateway, from each of the plurality of sensor nodes, the data related to the transmitted and/or received RF signals;
 transmitting, by the gateway, the received data related to the transmitted and/or received RF signals to a computing network;
 determining, by the computer network, from the data related to the transmitted and/or received RF signals, attenuation of RF signals transmitted between each of the plurality of sensor nodes; and
 correlating, by the computing network, the attenuation of the RF signals transmitted between each of the plurality of sensor nodes with the soil moisture content to determine average soil moisture content in soil between the plurality of sensor nodes.

15. The method of claim 14, wherein each sensor node comprises a processor in communication with a memory; a communication module; an antenna; and a power source.

16. The method of claim 15, wherein each of the communication modules comprises a transceiver and each of the transceivers is used by the plurality of sensor nodes to transmit and/or receive the RF signals and to transmit the data related to the transmitted and/or received RF signals to the gateway.

17. The method of claim 14, wherein the transmitted and/or received RF signals have a frequency range between 200 MHz and 1000 MHz.

18. The method of claim 14, wherein at least one of the plurality of sensor nodes comprises a master sensor node, wherein each of the plurality of sensor nodes transmit the data related to the transmitted and/or received RF signals to the master sensor node and the master sensor node transmits the data related to the transmitted and/or received RF signals to the gateway.

19. The method of claim 14, wherein one or more of the plurality of sensor nodes are buried at a depth that ranges between 0 and 100 cm, wherein a distance between any of the plurality of sensor nodes is up to 25 meters, and wherein a distance between any of the plurality of sensor nodes and the gateway is up to 60 meters.

20. The method of claim 14, wherein at least one of the plurality of sensor nodes further comprises a moisture sensor and a temperature sensor.

21. The method of claim 20, wherein the data related to the transmitted and/or received RF signals further comprises data from the moisture sensor and/or data from the temperature sensor and/or an identifier that identifies each of the plurality of sensor nodes individually.

22. The method of claim 21, wherein the data from the moisture sensor is used by the computing network to verify the determined average soil moisture content in the soil between the plurality of sensor nodes.

23. The method of claim 14, wherein the computing network uses the determined average soil moisture content in the soil between the plurality of sensor nodes to provide an input control signal to a separate system.

24. The method of claim 23, wherein the separate system is an irrigation system, and the input control signal causes the irrigation system to turn off, turn on, or to regulate a flow of water.

25. The method of any of claim 23, wherein the computing network uses AI and/or adaptive learning to generate the input control signal.

26. The method of claim 14, wherein the computing network uses AI and/or adaptive learning to determine the average soil moisture content in the soil between the plurality of sensor nodes.

27. The method of claim 14, wherein the computing network, determining the attenuation of the RF signals transmitted between each of the plurality of sensor nodes, further determines relative received signal strength (RSSI) and/or packet reception rate (PRR) between the plurality of sensor nodes.

* * * * *